(12) United States Patent
Stojanovic

(10) Patent No.: US 8,909,068 B2
(45) Date of Patent: Dec. 9, 2014

(54) SKEW ESTIMATOR, SKEW COMPENSATOR AND COHERENT RECEIVER

(75) Inventor: Nebojsa Stojanovic, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 13/435,300

(22) Filed: Mar. 30, 2012

(65) Prior Publication Data

US 2012/0213510 A1 Aug. 23, 2012

Related U.S. Application Data

(63) Continuation of application No. PCT/CN2011/071052, filed on Feb. 17, 2011.

(51) Int. Cl.
*H04B 10/61* (2013.01)

(52) U.S. Cl.
CPC ............ *H04B 10/613* (2013.01); *H04B 10/614* (2013.01); *H04B 10/616* (2013.01); *H04B 10/6165* (2013.01)
USPC ...................................................... 398/208

(58) Field of Classification Search
CPC .. H04B 10/613; H04B 10/614; H04B 10/616; H04B 10/6165
USPC ...................................................... 398/208
See application file for complete search history.

(56) References Cited

U.S. PATENT DOCUMENTS

| 7,970,290 B2 | 6/2011 | Tao et al. |
| 8,036,317 B2 | 10/2011 | D'Alessandro |
| 8,086,113 B2 * | 12/2011 | Nakashima et al. .......... 398/206 |
| 2006/0039506 A1 | 2/2006 | D'Alessandro |
| 2008/0036509 A1 | 2/2008 | Jang |
| 2008/0205905 A1 | 8/2008 | Tao et al. |
| 2009/0142076 A1 | 6/2009 | Li et al. |
| 2010/0135655 A1 | 6/2010 | Conroy et al. |

FOREIGN PATENT DOCUMENTS

| CN | 1723669 A | 1/2006 |
| CN | 101453269 A | 6/2009 |
| EP | 1962443 A1 | 8/2008 |
| WO | WO 2004/054194 A1 | 6/2004 |

OTHER PUBLICATIONS

Office Action dated May 14, 2013 in connection with Canadian Patent Application No. 2,767,975.
PCT International Search Report of the International Searching Authority; dated (mailed) Nov. 24, 2011, related to Application No. PCT/CN2011/071052, Huawei Technologies Co., Ltd. et al.
PCT Written Opinion of the International Search Report of the International Searching Authority; dated (mailed) Nov. 24, 2011, related to Application No. PCT/CN2011/071052, Huawei Technologies Co., Ltd. et al.

(Continued)

*Primary Examiner* — Shi K Li

(57) ABSTRACT

A skew estimator for estimating a skew between a first signal of a first data path and a second signal of a second data path in a coherent receiver is provided. The skew estimator comprises a phase detector and an integrator. The phase detector is configured to detect a phase of the first signal or the second signal to obtain a phase signal. Further, the integrator is configured to integrate the obtained phase signal to provide an estimated skew.

6 Claims, 18 Drawing Sheets

(56) References Cited

OTHER PUBLICATIONS

European Patent Office Communication, pursuant to Rule 62 EPC, the supplementary European search report (Art. 153(7) EPC) and the European search opinion related to Application No. 11818937.2-2415; dated (mailed) Aug. 29, 2012.

Petrou, Constantinos S.; "Quadrature Imbalance Compensation for PDM QPSK Coherent Optical Systems"; IEEE Photonics Technology Letters, vol. 21, No. 24, Dec. 15, 2009 (3 pgs.).

Gardner, Floyd M.: "A BPSK QPSK Timing Error Detector for Sampled"; IEEE Transactions on Communications, vol. COM-34, No. May 5, 1986 (7 pgs.).

Shannon, C.E.; "A Mathematical Theory of Communication"; Reprinted with corrections from *The Bell System Technical Journal*, vol. 27, pp. 379-423, 623-656, Jul., Oct. 1948 (55 pgs.).

Alexander, J.D.H.; "Clock Recovery From Random Binary Signals" Electronics Letters, Oct. 30, 1975, vol. 11, No. 22 (2 pgs.).

IP, Ezra et al.; "Digital Equalization of Chromatic Dispersion and Polarized Mode Dispersion"; Journal of Lightwave Technology, vol. 25, No. 8, Aug. 2007 (11 pgs.).

Pfau, Timo et al.; "First Real-Time Data Recovery for Synchronous QPSK Transmission With Standard DFB Lasers"; IEEE Photonics Technology Letters, vol. 18, No. 18, Sep. 15, 2006 (3 pgs.).

Gitlin, R.D.; "Fractionally-Spaced Equalization an Improved Digital Transversal Equalizer"; American Telephone and Telegraph Company, The Bell System Technical Journal, vol. 60, No. 2, Feb. 1981 (22 pgs.).

Amitay, N. et al.; "Linear equalization theory in digital data transmission over dually polarized fading radio channels"; AT&T Bell Laboratories Technical Journal (ISSN 0005-8580), vol. 63, Dec. 1984, p. 2215-2259; (1 pg.). (http://adsabs.harvard.edu/abs/1984ATTTJ..83.2215A).

Stojanovic, Nebojsa et al.; "On the Design of AGC Circuits in IM-DD NRZ Optical Transmission Systems"; Journal of Lightwave Technology, vol. 26, No. 20, Oct. 15, 2008 (8 pgs.).

Mueller, Kurt H. et al.; "Timing Recovery in Digital Synchronous"; IEEE Transactions on Communications, vol. COM-24, No. 5, May 1976 (16 pgs.).

\* cited by examiner

SKEW ESTIMATOR, SKEW COMPENSATOR AND COHERENT RECEIVER

CROSS-REFERENCE TO RELATED APPLICATION

This application is a continuation of International Application No. PCT/CN2011/071052, filed on Feb. 17, 2011, entitled "SKEW ESTIMATOR, SKEW COMPENSATOR AND COHERENT RECEIVER", which is hereby incorporated herein by reference.

BACKGROUND OF THE INVENTION

The present invention relates to a skew estimator for estimating a skew between a first signal of a first data path and a second signal of a second data path in a coherent receiver. Further, the present invention relates to a skew compensator for compensating the estimated skew and to a coherent receiver, in particular a coherent optical receiver, including a skew estimator and a skew compensator.

An important goal of long-haul optical fiber systems is to transmit the highest data throughput over the longest distance without signal regeneration in optical domain. Because of given constraints on the bandwidth imposed by optical amplifiers and ultimately by the fiber itself, it may be important to maximize spectral efficiency. Most systems use binary modulation formats, such as on-off keying encoding one bit per symbol.

According to references [1]-[6], advanced modulation formats in combination with coherent receivers enable high capacity and spectral efficiency. Polarization multiplexing, quadrature amplitude modulation and coherent detection may provide a winning combination for high-capacity optical transmission systems since they allow information encoding in all available degrees of freedom.

Further, commercial devices using QAM constellation are available in 40 and 100 Gb/s optical systems.

In this regard, FIG. 15 shows a schematic block diagram of a coherent optical receiver 1500. The coherent optical receiver 1500 has a receive (Rx) analog part 1501 and a receive (Rx) digital part 1503.

The Rx analog part 1501 has a local oscillator (LO) 1505 and a 90° hybrid 1507 having two poles. The hybrid 1507 receives the optical signal. Four optical front ends (OFE) 1509, 1511, 1513, and 1515 are coupled to the hybrid 1507. Each OFE block 1509-1515 is coupled to one automatic gain control (AGC) block 1517, 1519, 1521, and 1523. Further, each AGC block 1517-1523 is coupled towards an analog-digital converter (ADC) 1525, 1527, 1529, and 1531. In detail:

Since the digital signal is mapped into both polarizations, the 90° hybrid 1507 is used to mix the input optical signal with a local oscillator (LO) signal of the LO 1505 that results in four output signals, namely two signals per polarization. The optical OFEs 1509-1515 are configured to convert the respective electrical signal into an optical signal. The respective OFE 1509-1515 may comprise a photo diode and a transimpedance amplifier (TIA). Because the signal power may vary over time, the AGC blocks 1517-1525 may compensate for signal power variations (see reference [7]). The four AGC blocks 1517-1525 may also be an internal part of the OFE blocks 1509-1515.

Due to realization complexity, a pair of AGC blocks may be controlled by one control signal. For example, the pair of AGC blocks 1517, 1519 may be controlled by the control signal VXAGC for X polarization. Further, the pair of AGC blocks 1521, 1523 may be controlled by the control signal VYAGC for Y polarization. Further, the four AGC blocks 1517-1523 may be controlled by four independent control voltages or control signals.

The signals output by the AGC blocks 1517-1523 may be quantised by the ADCs 1525-1531. The four ADCs 1525-1531 may output an X-polarized in-phase signal (XI), an X-polarized quadrature-phase signal (XQ), a Y-polarized in-phase signal (YI) and a Y-polarized quadrature-phase signal (YQ).

Further, the four quantised digital data streams XI, XQ, YI and YQ are further processed in a digital signalling processing (DSP) block 1533 of the Rx digital part 1503. The DSP 1533 may comprise a software part 1535 and a hardware part 1537. The hardware part 1537 may be fast compared to the slow software part 1535. The DSP block 1533 may be configured to compensate for chromatic dispersion (CD), polarization mode dispersion (PMD), polarization rotation, non-linear effects, LO noise, LO frequency offsets and the like. Moreover, an estimation of slow processes, like LO frequency offsets or CD, may be done in the software part 1535 of the DSP block 1533.

Further, FIG. 16 shows a schematic block diagram of basic DSP blocks 1600. The DSP 1600 has a software part 1601 and a hardware part 1603. The hardware part 1603 has an offset and gain adjustment (AGC) block 1605.

Coupled to the AGC block 1605, there are two compensation blocks 1607 and 1609, namely a chromatic dispersion (CD) block for X polarization 1607 and a CD compensation block 1609 for Y compensation.

Further, the hardware block 1603 comprises a frequency recovery block 1611 and a polarization mode dispersion (PMD) and chromatic dispersion (CD) compensation and depolarization block 1613 coupled to the recovery block 1611. The PMD/CD compensation and depolarization block 1613 may comprise a finite impulse response (FIR) filter.

Moreover, a timing estimation block 1615 receives the outputs of the CD compensation block 1609 and the PMD/CD compensation and depolarization block 1613 for providing a timing information towards a VCC 1617.

After the block 1613, a carrier recovery block 1619 is coupled to a decoding detection block 1621.

Further, between the data paths providing the input signals X, XQ, Y and YQ, there are four ADCs 1623, 1625, 1627 and 1629 coupled. In detail:

After offset and gain correction by block 1605, the four signals are equalized for chromatic dispersion in frequency domain using the two fast Fourier transformation (FFT) blocks 1607 and 1609. The frequency offset may be removed in the frequency recovery block 1611. Polarization tracking, PMD compensation and residual CD compensation may be done in time domain using FIR filters 1613, exemplarily arranged in a butterfly structure.

The carrier recovery block 1619 is configured to provide residual frequency offset and carrier phase recovery. When differential decoding is applied at the transmitter side (not shown), a differential decoder may be used in the decoding and frame detection block 1621.

Further, CD may efficiently be compensated in the FFT blocks 1607 and 1609. The compensation CD function may be $$CD^{-1}(DL) = \exp\left(-j\left(\frac{2\pi n f_s}{N}\right)^2 \frac{\lambda_0^2 DL}{4\pi c}\right) \quad (1)$$

where λ0 is the signal wavelength, fs is the sampling frequency, N is the FFT size, c is the speed of light, n is the tap number, L is fiber length, and D is the dispersion coefficient.

Due to complexity reasons, only one FFT block 1701 using complex input may be applied to each polarization, as exemplarily shown in FIG. 17. The inverse FFT (IFFT) 1703 may be identical to the FFT 1701 although real and imaginary parts are swapped at input and output.

Between the FFT block 1701 and the IFFT block 1703, an inverse chromatic dispersion (CD−1) block 1705 is coupled.

The four data paths, as exemplarily shown in FIG. 16, may have different length or delay. As a consequence, different arriving instances cause penalties, in particular significant penalties depending on the actual conditions of the channel and the amount of data delays. For example, in 112 G QPSK transmission systems with a symbol length of about 36 ps, the penalties due to I/Q skew are shown in FIG. 18. In FIG. 18, the x-axis shows the I/Q skew and the y-axis shows the required OSNR at BER of 0.001. It may be noted that a skew of 5 ps may result in 1 dB OSNR penalty. This skew value may be expected in 112 G coherent receivers. The skew may come from different transfer functions of the 90° hybrid, the OFE, the AGC, the ADC and connections between them. Furthermore, the skew between two polarizations may not be so difficult because it may be manifest as an additional differential group delay (DGD). This skew may be compensated by the use of the FIR filter. However, in this case, the DGD operating range may be decreased by the skew value. As a result, it may be desired to compensate also for the X/Y skew.

On the other hand, skew effects clock recovery performance when all four data paths are used for timing extraction.

It may be more difficult when residual dispersion should be compensated after the FFT block in the FIR block. Results for 112 G QAM with RD of −340 ps/nm are presented in FIG. 19. In particular, FIG. 19*a* shows the signal constellation with CD without skew and FIG. 19*b* shows the same for a skew of 8 ps. Further, it may be noted that a Y polarization may have more problems than an X polarization even after 50 FIR filter updates.

Regarding skew compensation, the path delay offsets between XI, XQ, YI and YQ data may be measured by applying an identical optical signal, in particular a single polarization, to all photo detectors during factory calibration. This may be done by turning off the LO and increasing the power of the signal. A common, directly detected signal may be incident on all photo detectors. Then, data blocks may be transferred to a personal computer (PC), either from before a variable FIFO buffer or after fixed filters, with all filters providing a single impulse response.

Then, the data may be interpolated and then cross-correlated between the four data paths. The relative peaks may be used to determine the relative time offsets. In particular, FIFO may be compensated for the minimum skew of the sampling period.

SUMMARY OF THE INVENTION

One of the goals to be achieved by the present disclosure is to estimate a skew which is less than the sampling interval of the coherent receiver.

According to a first aspect, a skew estimator for estimating a skew between a first signal of a first data path and a second signal of a second data path in a coherent receiver is suggested. The skew estimator comprises a phase detector and an integrator. The phase detector is configured to detect a phase of the first signal or the second signal to obtain a phase signal.

Further, the integrator is configured to integrate the obtained phase signal to provide an estimated skew.

According to some implementations, a particular skew which is smaller than a sampling interval of the coherent receiver may be estimated and therefore compensated. Thus, according to some implementations, skew as the result of aging, temperature variations, device switching and such may be estimated and therefore compensated. According to some implementations, the present skew estimation is flexible and may be sped up when skew is small. In this case, the present skew estimation may use all phase detectors available for providing the timing information.

Further, according to some implementations, the present skew estimation is robust against large skew. In this regard, the phase detectors may be switched step by step when they fulfil predefined skew limits. In particular, maximum skew that can be compensated between two data lines is half of symbol period. It may be extended up to one symbol period if we add skew between polarizations, X and Y.

According to some implementations, the present skew estimation may be done at a slower rate in the DSP part of the coherent receiver, in particular in the software part of the DSP. The skew estimator may be built all in software or all in hardware. Further, parts of timing extraction blocks in hardware may be used for the skew estimator, e.g. just outputs of phase detectors. In addition, data blocks may be loaded in software for processing.

In particular, the coherent receiver has at least two data paths or data lines. For example, the coherent receiver is a coherent optical receiver.

Moreover, the skew estimation may use data before the FIR block of the coherent receiver according to some implementations. This feature is already required in some optical coherent receivers, so that there may be no additional hardware efforts or costs.

Further, according to some implementations, the estimated skew may be accurately monitored. Further, the present skew estimation may be applied in any coherent receiver with multiple data paths.

Assuming an example of an FIR filter designed to compensate up to RD of −340 ps/nm and having a limited number of taps. Because the acquisition of the FIR filter becomes critical for a certain skew, the present skew estimation may be used for enhancing skew effects.

According to a first implementation form of the first aspect, the first signal is an in-phase signal and the second signal is a quadrature-phase signal.

According to a second implementation form of the first aspect, the skew estimator has a first phase detector for detecting the phase of the first signal to obtain a first phase signal, a second phase detector for detecting the phase of the second signal to obtain a second phase signal, a subtractor for outputting a difference signal between the obtained first phase signal and the obtained second phase signal, and an integrator for integrating the output difference signal to provide the estimated skew.

The subtractor may be any subtracting means which is configured to calculate the difference signal between the two phase signals. Further, the integrator may be any means or integrating means which is configured to integrate or count the output difference signal for providing the estimated skew.

According to a third implementation form of the first aspect, the skew estimator has a first phase detector for detecting the phase of the first signal to obtain a first phase signal, a second phase detector for detecting the phase of the second signal to obtain a second phase signal, a subtractor for outputting a difference signal between the obtained first phase signal and the obtained second phase signal, a low-pass filter for filtering the output difference signal, and an integrator for integrating the filtered difference signal to provide the estimated skew.

The low-pass filter may be an infinite impulse response (IIR) low-pass filter. The low-pass filter may be configured to smooth differences between the phase detectors.

According to a fourth implementation form of the first aspect, the skew estimator has a first phase detector for detecting the phase of the first signal to obtain a first phase signal, a second phase detector for detecting the phase of the second signal to obtain a second phase signal, a subtractor for outputting a difference signal between the obtained first phase signal and the obtained second phase signal, a low-pass filter for filtering the output difference signal, a determiner for determining the sign of the filtered difference signal to obtain a sign signal, and an integrator for integrating the obtained sign signal to provide the estimated skew.

The sign signal output by the determiner may be counted and a starting digital value of the estimated skew, in particular the estimated IQ skew, may be derived. After a certain convergence time, the phase detectors' difference may be close to zero, so the angle value at the integrator output represents the true skew value. This value may also be monitored.

According to a fifth implementation form of the first aspect, the skew estimator has a monitor for monitoring the estimated skew provided by the integrator.

According to a sixth implementation form of the first aspect, the skew estimator has four phase detectors for detecting a respective phase of an X-polarized in-phase signal, an X-polarized quadrature-phase signal, a Y-polarized in-phase signal and a Y-polarized quadrature-phase signal to obtain a respective phase signal, and an adder for providing a sum signal by adding the four phase signals. In this sixth implementation form, each data path is coupled to one block. The respective block includes a subtractor for providing a difference signal between the sum signal and the respective phase signal provided by the respective data path, a low-pass filter for filtering the output difference signal, a determiner for determining the sign of the filtered differential signal to obtain a sign signal, and an integrator for integrating the obtained sign signal to provide the estimated skew of the respective phase signal provided by the respective data path.

The sixth implementation form of the first aspect may be applicable in situations where the skew is not too large and does not affect the clock recovery. In a case with a large skew, it may be recommended to use one data path for timing information and add other data paths when the signals are deskewed. It may be noted that above-mentioned phase detectors may also work with complex data (I+jQ). The complexities of complex and real phase detectors may be comparable.

Any implementation form of the first aspect may be combined with any implementation form of the first aspect to obtain another implementation form of the first aspect.

According to a second aspect, a skew compensator for compensating a skew between a first signal of a first data path and a second signal of a second data path in a coherent receiver is suggested. The skew compensator comprises an above explained skew estimator of the first aspect or of any implementation form of the first aspect. The skew estimator is configured to provide an estimated skew between the first and second signals. The skew compensator is configured to compensate the skew between the first and second signals in dependence on the estimated skew.

According to some implementations, the compensation or deskewing may be done in three different ways. A first way may be to control ADC sampling phases. A second way may be to deskew in frequency domain and a third way may be to deskew in time domain. Controlling the ADC sampling phases and deskewing in frequency domain relax clock recovery and FIR filter blocks while deskewing in time domain improves the performance of the FIR block.

Further, according to some implementations, data after the FIR block may also be used for skew estimation. This may relax skew estimation when the DGD and SOP approaches critical limits for phase detectors used for the skew estimation.

According to a first implementation form of the second aspect, the skew compensator has at least one phase shifter for shifting the phase of at least one of the first and second signals for controlling analog-digital-converter sampling phases.

According to a second implementation form of the second aspect, the skew compensator has an adaptor for adapting a Fast-Fourier-Transformator of the optical receiver for deskewing the estimated skew in frequency domain.

According to a third implementation form of the second aspect, the skew compensator has an adjustor for adjusting an interpolator of the optical receiver for deskewing the estimated skew in time domain.

Any implementation form of the second aspect may be combined with any implementation form of the second aspect to obtain another implementation form of the second aspect.

According to a third aspect, a skew compensator for compensating a skew between an X-polarized in-phase signal, an X-polarized quadrature-phase signal, an Y-polarized in-phase signal and an Y-polarized quadrature-phase signal in a coherent receiver is suggested. The skew compensator comprises a skew estimator of the sixth implementation form of the first aspect. The skew estimator is configured to provide a respective estimated skew of the X-polarized in-phase signal, the X-polarized quadrature-phase signal, the Y-polarized in-phase signal and the Y-polarized quadrature-phase signal. Moreover, the skew compensator comprises four phase shifters for phase shifting the respective phase of the X-polarized in-phase signal, the X-polarized quadrature-phase signal, the Y-polarized in-phase signal and the Y-polarized quadrature-phase signal in dependence on the respective estimated skew.

According to a fourth aspect, an optical receiver, in particular a coherent optical receiver is suggested. The optical receiver comprises an above explained skew estimator for providing an estimated skew between a first signal of a first data path and a second signal of a second data path.

According to an implementation form of the fourth aspect, the optical receiver has a timing estimator for providing a clock recovery in the optical receiver, and an adaptor for adapting the timing estimator in dependence on the estimated skew.

According to a fifth aspect, a system, in particular a communication system is suggested, the system comprising at least one optical receiver in a communication network.

According to a sixth aspect, a method for estimating a skew between a first signal of a first signal data path and a second signal of a second data path in a coherent receiver is suggested. The method has a step of detecting a phase of the first signal or the second signal to obtain a phase signal. Further, the method has a step of integrating the obtained phase signal for providing the estimated skew.

According to a seventh aspect, the present disclosure relates to a computer program comprising a program code for estimating a skew between a first signal of a first signal data path and a second signal of a second data path in a coherent receiver when run on at least one computer.

The skew estimator may be any skew estimating means. The skew compensator may be any skew compensating means. The respective means may be implemented in hardware or in software. If the means are implemented in hardware, it may be embodied as a device, e.g. as a computer or as a processor or as a part of a system, e.g. a computer system. If the means are implemented in software it may be embodied as a computer program product, as a function, as a routine, as a program code or as an executable object.

BRIEF DESCRIPTION OF THE DRAWINGS

Further embodiments of the invention will be described with respect to the following figures in which.

DETAILED DESCRIPTION OF EMBODIMENTS OF THE INVENTION

Figure 1:
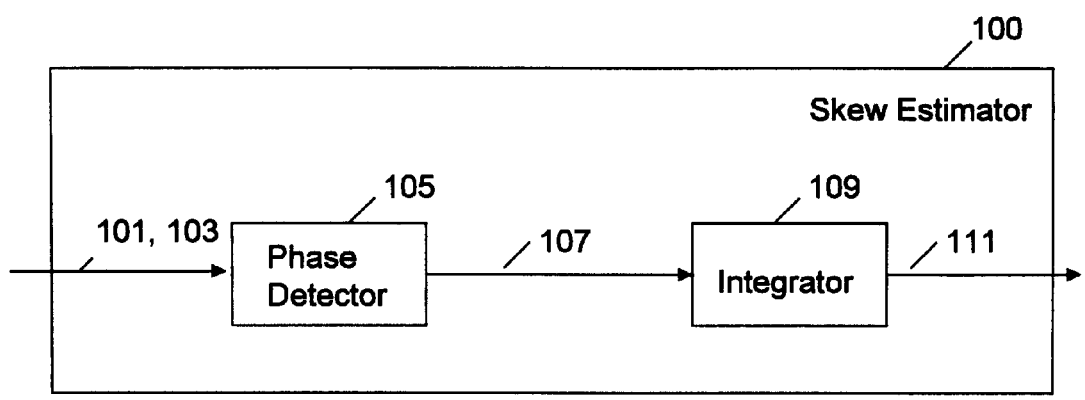
FIG. 1 shows a block diagram of an embodiment of a skew estimator.

In FIG. 1, a block diagram of an embodiment of a skew estimator 100 is depicted.

The skew estimator 100 may be part of a coherent receiver, in particular a coherent optical receiver. The skew estimator 100 is configured to estimate the skew between a first signal 101 of a first data path and a second signal 103 of a second data path in the optical receiver. The skew estimator 100 has a phase detector 105 for detecting a phase of the first signal 101 or the second signal 103 to obtain a phase signal 107. The skew estimator 100 receives the first signal 101 or the second signal 103. The phase signal 107 is output by the phase detector 105.

Further, the skew estimator 100 has an integrator 109. The integrator 109 is configured to integrate the obtained phase signal 107 to provide an estimated skew 111 between the first signal 101 and the second signal 103.

In particular, the first signal 101 is an in-phase signal and the second signal 103 is a quadrature-phase signal.

In the following, further details and embodiments are described. In digital communication systems, a key aspect of each receiver is a clock recovery circuit that extracts frequency and phase from incoming data and forces a local clock source to sense received data with a symbol rate at the appropriate sampling phase. Several phase detectors are proposed for use in digital systems. For example, in reference [8] a phase detector is suggested by Mueller and Müler (M&M PD). Further, in reference [9], there is a phase detector suggested by Alexander (Alex-PD). Moreover, in reference [10], Gardner explains a further phase detector (Gard-PD).

Figure 2A:
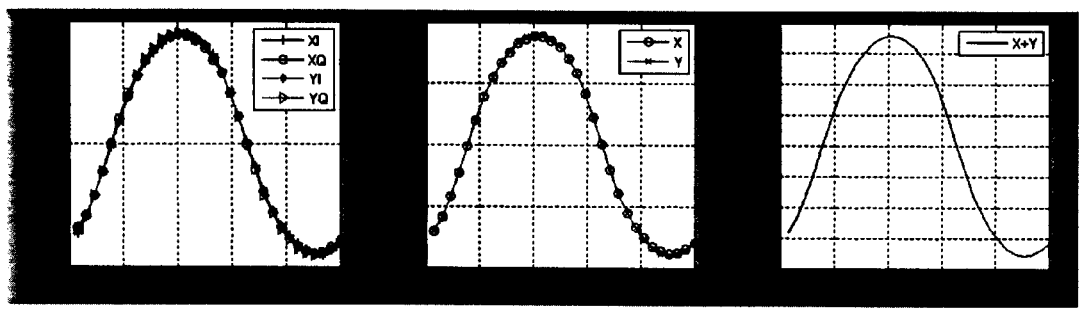
FIG. 2a shows a diagram illustrating the TEDCs of a phase detector according to Alexander.
Figure 2B:
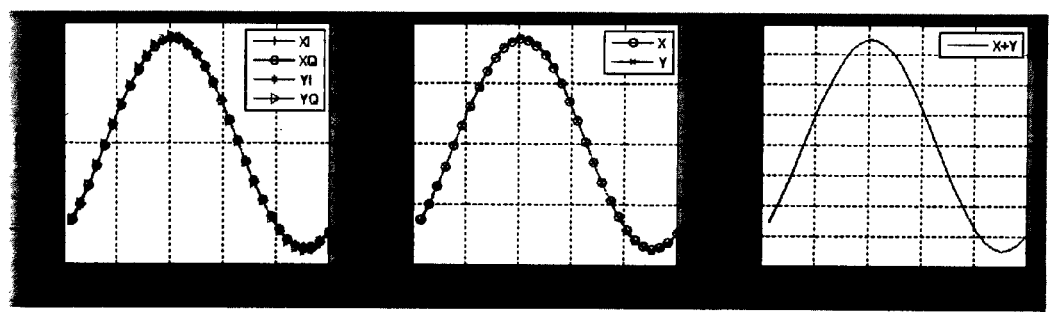
FIG. 2b shows diagrams illustrating the TEDCs of a phase detector according to Gardner.

Moreover, with respect to reference [11], each phase detector (PD) may be well described by the Timing Error Characteristic (TEDC), the maximum TEDC value (TEDCMAX) and the rms jitter (RMSJ). All above-mentioned phase detectors pertain to a group of early-late detectors. They may be used for receiving skew information, and therefore these suggested phase detectors may be used as the phase detector 105 of FIG. 1, for example. Further, in FIGS. 2a and 2b, the TEDCs of Alex-PD and Gard-PD are presented. It may be noted that phase characteristics are always the same for all four data paths since there is no skew between them. Without loss of generality, phase detectors of the Gardner type are used to derive skew information in the following.

Figure 3A:
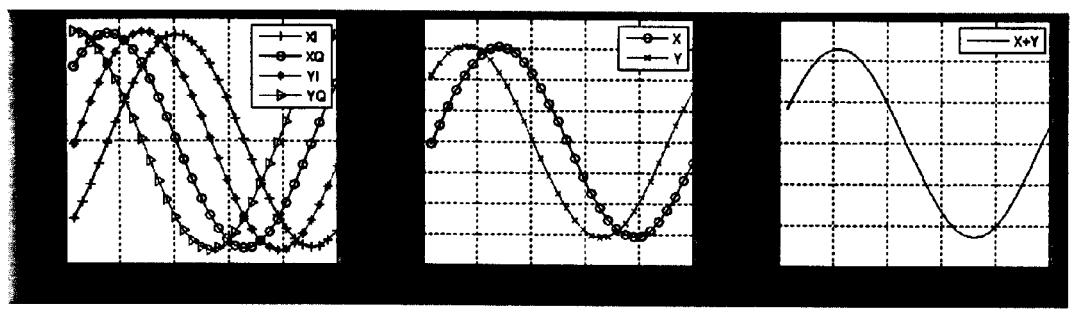
FIG. 3a shows diagrams illustrating the TEDCs for an XY skew of 0.125 UI and an IQ skew of 0.25 UI.
Figure 3B:
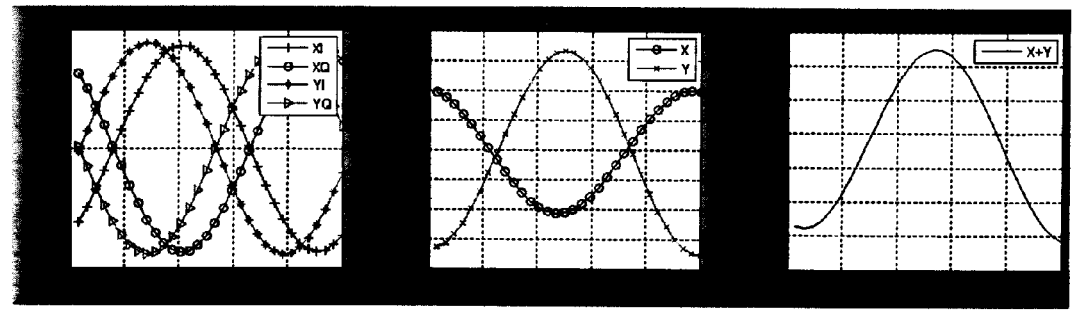
FIG. 3b shows diagrams illustrating the TEDCs for an XY skew of 0.125 UI and an IQ skew of 0.5 UI.

Further, FIG. 3a shows diagrams illustrating the TEDCs for X/Y skew of 0.125 UI and an IQ skew of 0.25 UI (UI: unit interval). For comparison issues, FIG. 3b shows diagrams illustrating the TEDCs for an X/Y skew of 0.125 UI and an IQ skew of 0.5 UI.

With respect to FIG. 3a, it may be observed that the skew shifts TEDCs. As a consequence, the total TEDC is decreased. This may also amplify the jitter of the voltage controlled oscillator (VCO). With a skew of 0.5 UI, the TEDC disappears (see FIG. 3b). The maximum value of the equivalent TEDC is 2.5 e-3 which makes the VCO unstable with a loss of timing information.

Figure 4:
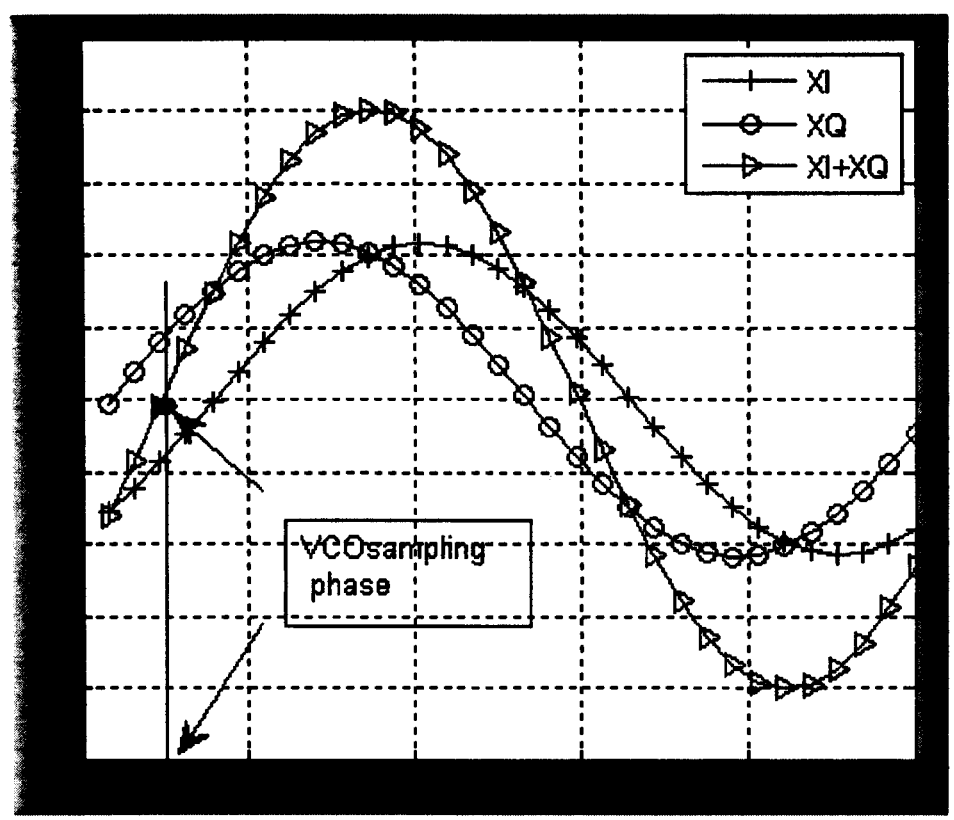
FIG. 4 shows a diagram illustrating the TEDCs for an X polarization with an IQ skew of 0.125 UI.

FIG. 4 depicts a diagram illustrating the TEDCs for X polarization with an IQ skew of 0.125 UI. In FIG. 4, there are three TEDCs corresponding to XI timing information, XQ timing information and XI+XQ timing information, respectively. Depending on the VCO scenario, the VCO may take either both TEDC curves for XI timing information and XQ timing information or one of them for clock extraction.

Assuming a first scenario, both TEDCs are used. The equilibrium point, namely the VCO sampling phase, lies between the TEDCs of XI and XQ. The equilibrium point may be indicated by the positive zero-crossing of the TEDC. It may be noted that the XQ TEDC has positive amplitude and the XI TEC has negative amplitude in the indicated VCO sampling phase in the equilibrium point. This information may be used to force e.g. the equilibrium phase of XQ PD to the equilibrium phase of XI PD. As a result, the equilibrium phase of XI+XQ PD gets closer to the equilibrium point of XI PD automatically.

Figure 5:
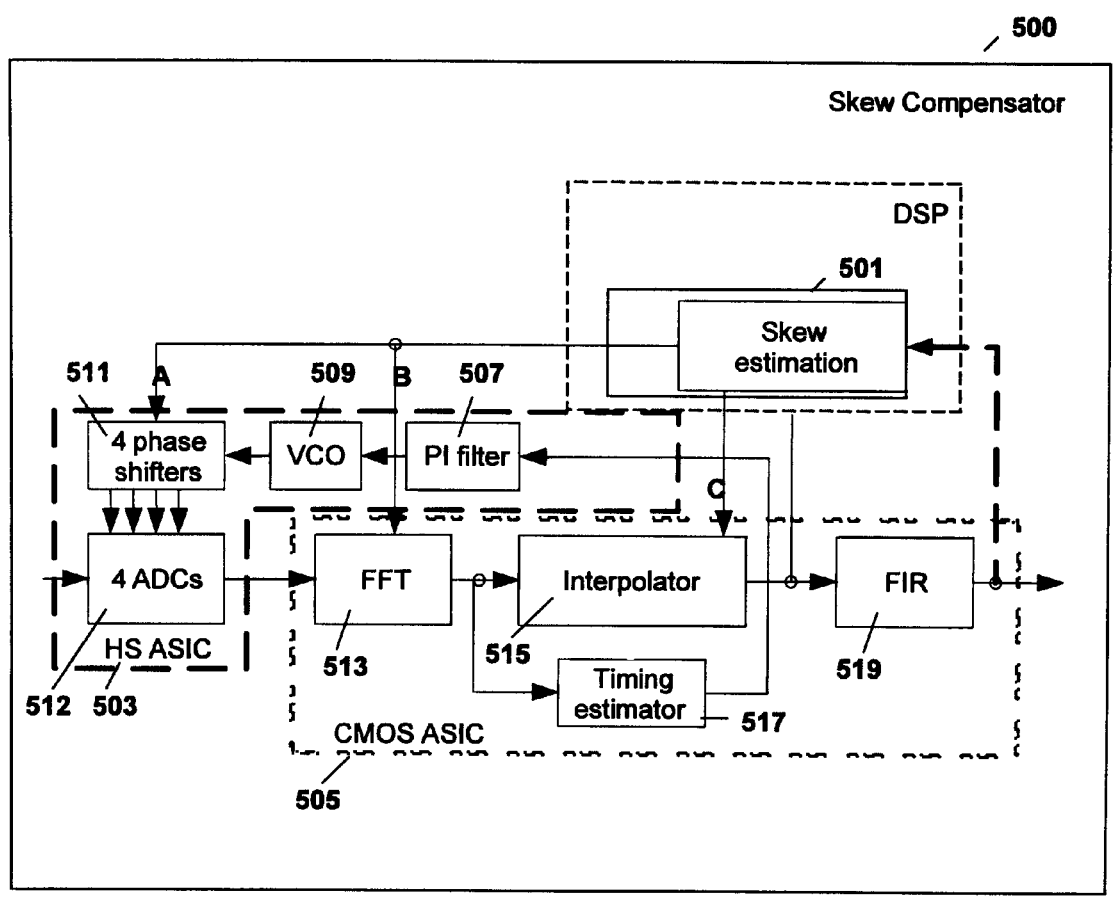
FIG. 5 shows a block diagram of a first embodiment of a skew compensator.

FIG. 5 shows a block diagram of a first embodiment of a skew compensator 500. The skew compensator 500 has a skew estimator 501, an HS ASIC 503 and a CMOS ASIC 505. The HS ASIC 503 has a PI filter 507, a VCO 509, four phase shifters 511 and four ADCs 512. The CMOS ASIC 505 comprises an FFT 513, an interpolator 515, a timing estimator 517 and an FIR filter 519.

Due to jitter tolerant requirements and data delays through the CMOS ASIC 505, a feed-forward clock recovery is required in coherent receivers. After the FFT block 513, timing information is derived and used in the interpolator 515. Also, this timing information is filtered and applied for VCO phase-frequency control and adjustment by the timing estimator 517 and the PI filter 507. Data blocks before the FIR block 519 are periodically loaded in the DSP, in particular in the software part, for CD estimation, FIR starting taps calculation and the like. The same data may be used for skew estimation. The skew estimator 501 in the DSP estimates the skew between the data paths and forwards this information to blocks that depend on a preferred deskewing scenario. Deskewing may be done in three different ways: Controlling ADC sampling phases (indicated by reference sign A), deskewing in frequency domain (indicated by reference sign B) and deskewing in time domain (indicated by reference sign C).

A and B may relay clock recovery and FIR filter blocks while C may improve the performance of the FIR block 519.

Moreover, data after the FIR block 519 may also be used for the skew estimator 501. This may relax the skew estimation when DGD and SOP approaches critical limits for phase detectors in the skew estimation.

Figure 6:
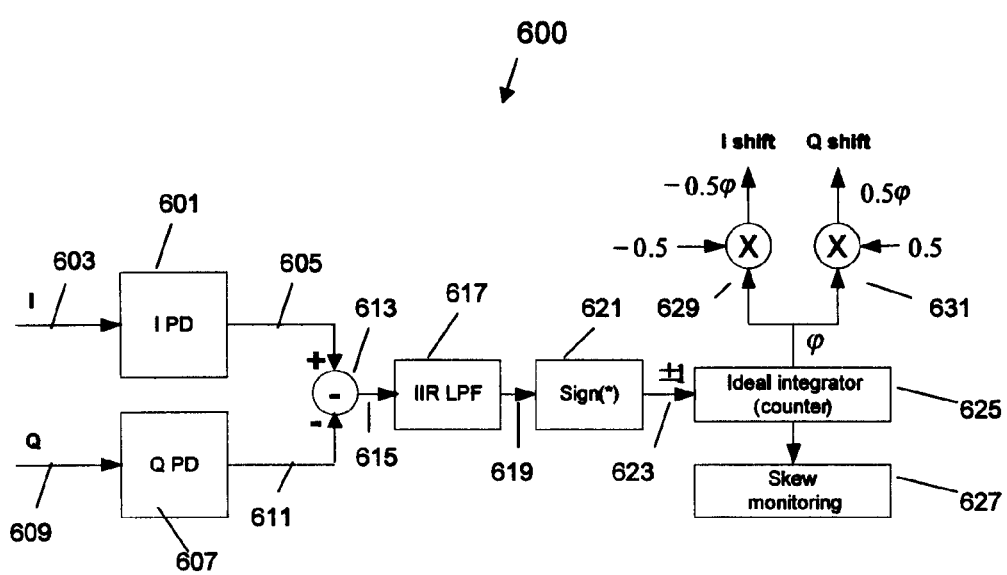
FIG. 6 shows a block diagram of a second embodiment of a skew compensator.

FIG. 6 depicts a block diagram of a second embodiment of a skew compensator 600. The skew compensator 600 has a first phase detector 601 for detecting the phase of a first signal (I) 603 to obtain a first phase signal 605. Further, the skew compensator 600 has a second phase detector 607 for detecting the phase of a second single (Q) 609 to obtain a second phase signal 611.

A subtractor 613 is configured to output a difference signal 615 between the obtained first phase signal 605 and the obtained second phase signal 611. A low-pass filter 617 receives the difference signal 615. The low-pass filter 617 may be an IIR low-pass filter. The low-pass filter 617 filters the output difference signal 615 and outputs a filtered difference signal 619. The filtered difference signal 619 is input to a determiner 621. The determiner 621 is configured to determine the sign of the filtered difference signal 619 to obtain a sign signal 623 which is input to an integrator 625. The integrator 625 is configured to integrate or count the obtained sign signal 623 to provide an estimated skew φ. The estimated skew cp may be monitored by a skew monitor 627. Further, the estimated skew φ may be input to shifters 629, 631 shifting I and Q, respectively. This may particularly be relevant, if the clock recovery uses both I and Q data for timing extraction. For this case, the TEDCs are already presented in FIG. 4. This scenario may be applicable when the skew is not too large, e.g. less than 30% of symbol interval, so that I+Q TEDC is not too small. In particular, a maximum expected skew is about 0.25 UI.

With reference to FIG. 4, it may be observed that the PDs difference has a negative value. Thus, I data may be sampled a bit earlier and Q data a bit later. After a certain time, this difference is getting smaller and smaller until the equilibrium points of both PDs are at an identical position.

Figure 7:
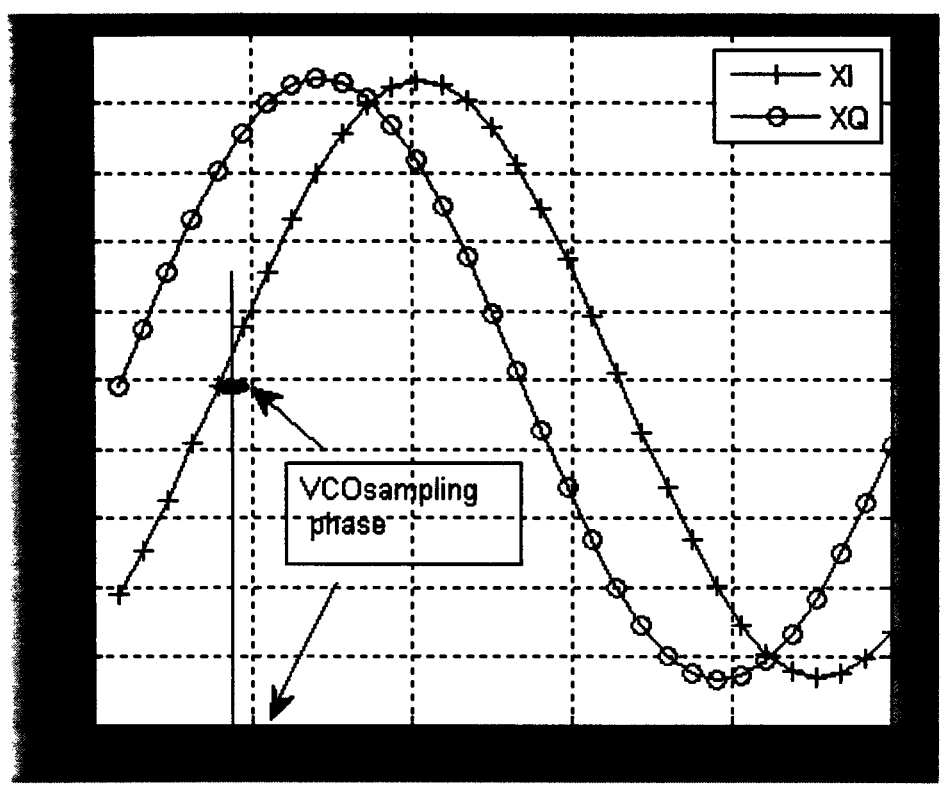
FIG. 7 shows a diagram illustrating a VCO working on XI data.

When the timing recovery uses only I data like shown in FIG. 7, an I shift is not necessary. In this case, Q data are shifted by the full angle derived in the skew estimator. After Q PD deskewing, the Q data may be used for improving the clock performance, as earlier mentioned by A and B in FIG. 5.

Figure 8:
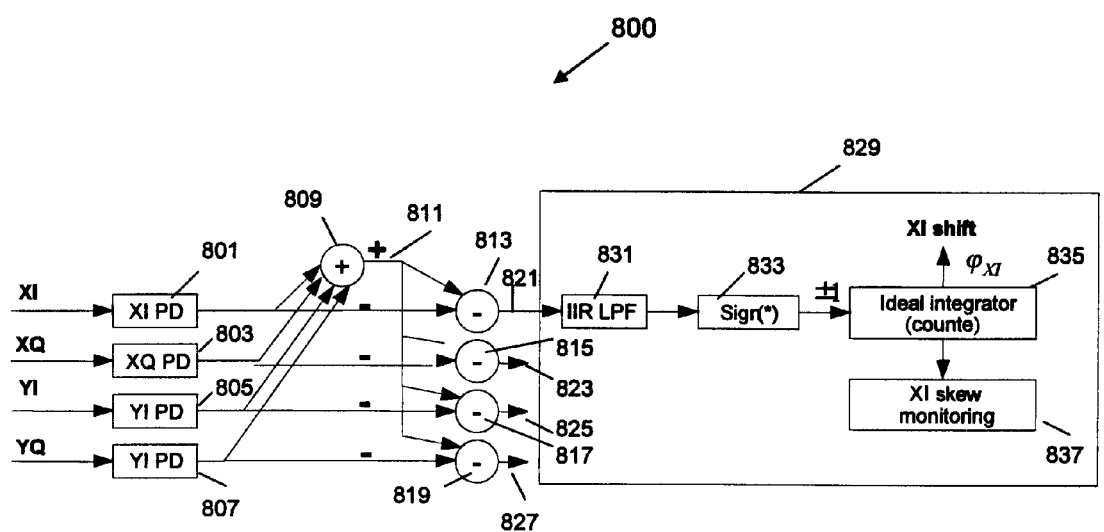
FIG. 8 shows a block diagram of a third embodiment of a skew compensator.

FIG. 8 shows a block diagram of third embodiment of a skew compensator 800. The skew compensator 800 receives four signals, namely an X-polarized in-phase signal XI, an X-polarized quadrature-phase signal XQ, a Y-polarized in-phase signal YI and a Y-polarized quadrature-phase signal YQ.

For each of the four input signals, XI, XQ, YI, YQ, the skew compensator 800 has one phase detector 801, 803, 805 and 807 for detecting a respective phase of the respective input signal XI, XQ, YI, YQ.

Further, the skew compensator 800 has an adder 809 for providing a sum signal 811 by adding the four phase signals output by the phase detectors 801, 803, 805 and 807.

Further, for each data path, there is one subtractor 813, 815, 817 and 819. The respective subtractor 813-819 provides a difference signal 821, 823, 825 and 827. The respective difference signal 821-827 is input to a respective block 829. In FIG. 8, only one block 829 coupled towards the first subtractor 813 is shown. The respective block, exemplarily block 829, has a low-pass filter 831, a determiner 833, an integrator 835 and a monitor 837. The low-pass filter 831 may be an IIR low-pass filter. Further, the low-pass filter 831 is configured to filter the output difference signal 821. The determiner 833 is configured to determine the sign of the filtered difference signal to obtain a sign signal ($\pm 1$). The integrator 835 is configured to integrate or count the obtained sign signal ($\pm 1$) to provide an estimated skew φXI for the block 829. By means of the estimated skew φXI, the XI data may be shifted. Further, the XQ skew monitor 837 monitors the estimated skew φXI.

Figure 9:
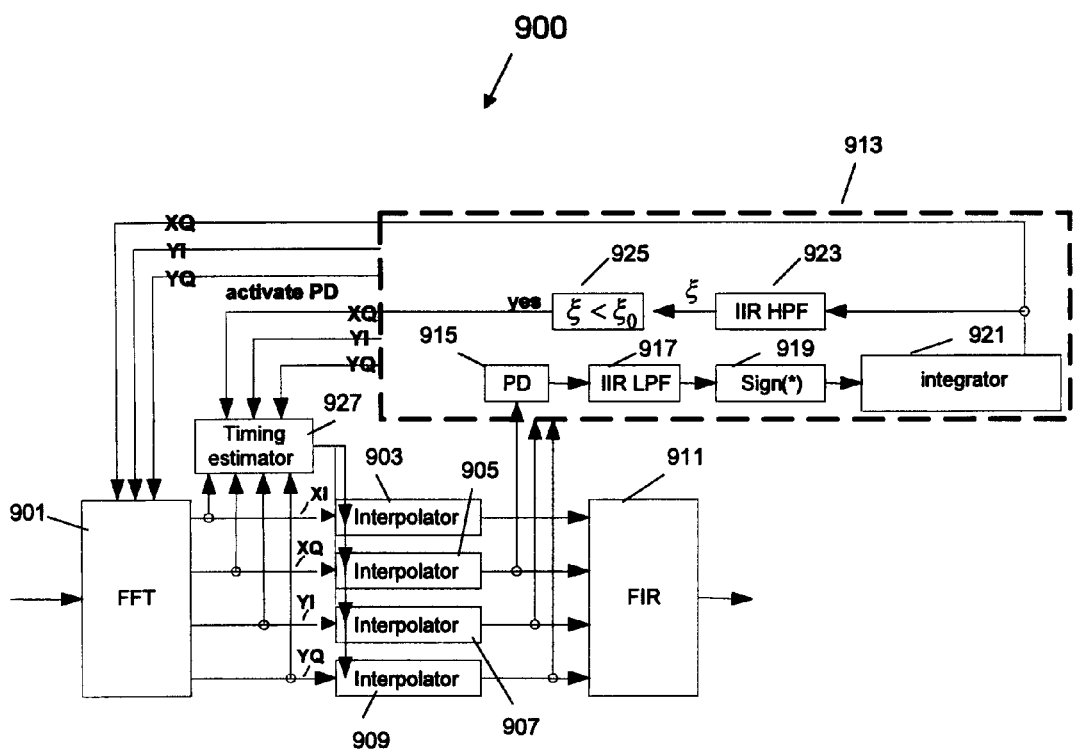
FIG. 9 shows a block diagram of a fourth embodiment of a skew compensator.

FIG. 9 shows a block diagram of a fourth embodiment of a skew estimator 900. The skew estimator 900 has an FFT block 901 providing XI data, XQ data, YI data and YQ data. Further, the skew compensator 900 has four interpolators 903, 905, 907 and 909 for each of the XI data, XQ data, YI data and YQ data. Further, the skew compensator 900 includes an FIR filter 911 coupled to the interpolators 903, 905, 907, 909.

According to the embodiment of FIG. 9, only XI data are used in the timing estimation block of the coherent optical receiver. Thus, the VCO of the optical receiver is locked on XI data. The interpolators 903, 905, 907 and 909 between the FFT block 901 and the FIR block 911 are used to compensate for data processing delay, in particular jitter tolerance requirements. Data of the XQ interpolator 905, the YI interpolator 907 and the YQ interpolator 909 are periodically loaded to DSP 913 for skew estimation. Without loss of generality, there is only one processing block (algorithm) in the DSP 913 shown for XQ. There are two further processing blocks (not shown) in the DSP 913 for YI and YQ data. The skew estimator of FIG. 9 implemented in the DSP 913 is simple, because there is no need for a comparison circuit. The skew value XQ of DSP 913 is forwarded to the FFT block 901 where a deskew operation may be done.

In detail, the DSP 913 has a phase detector (PD) 915, a low-pass filter (IIR LPF) 917, a determiner (sign (*)) 919, an integrator 921, a high-pass filter (IIR HPF) 923 and a comparator 925.

The high-pass filter 923 is configured to deliver small values, when the skew is small, in particular the respective signal is enough deskewed in the FFT block 901. This value may be compared to a reference value in the comparator 925. When the output of the high-pass filter 923 is smaller than the reference value, a signal activating the corresponding PD is sent to the timing estimator 927 of the skew compensator 900. As a result, after skew compensation, all data paths are aligned. Further, the performance of the clock recovery and the FIR block 911 are optimized.

It may be noted that skew compensation with an analog scenario as shown in FIG. 9 may be done by adjusting ADC sampling phases, as indicated by A in FIG. 5. Further, an additional sampling phase shift may be done in time domain interpolators, also in the ADCs. A certain phase shift may be added to adjust the sampling phase. In particular, if it is necessary, an additional sampling phase shift may be done in the time domain interpolators, or in the ADCs. However, this phase shift may be compensated in the skew estimation block by adding some constant value to the ideal integrators (counters).

Figure 10:
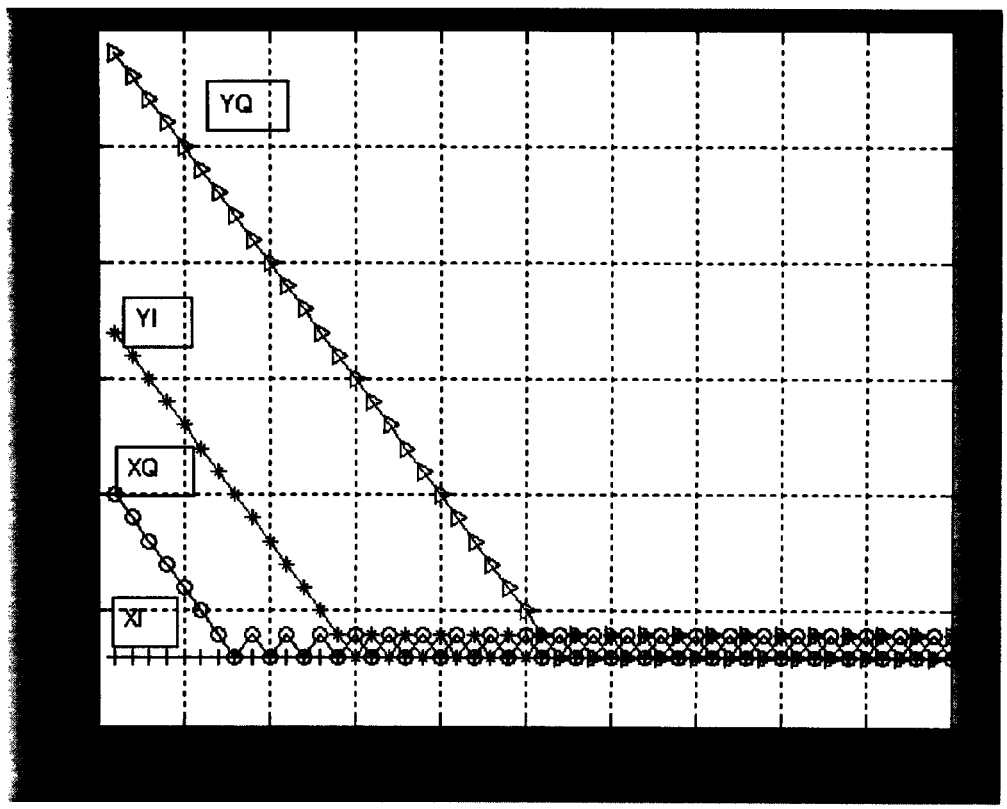
FIG. 10 shows a diagram illustrating deskewing simulation results.
Figure 11A:
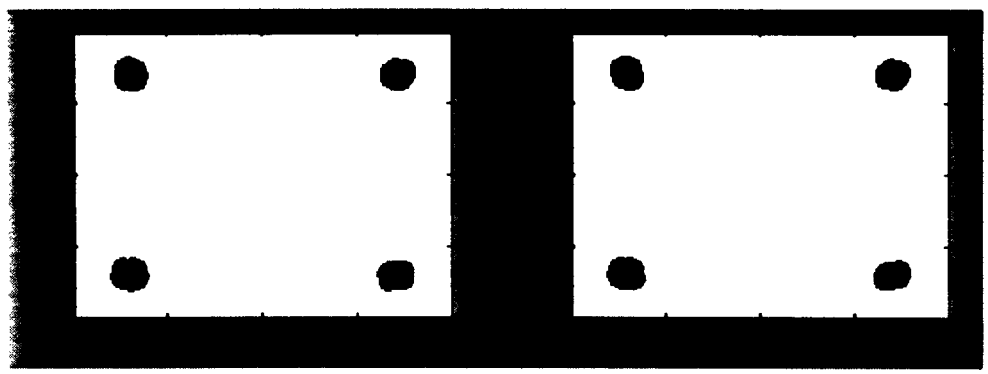
FIG. 11a shows a diagram illustrating a signal constellation with compensated skew.
Figure 11B:
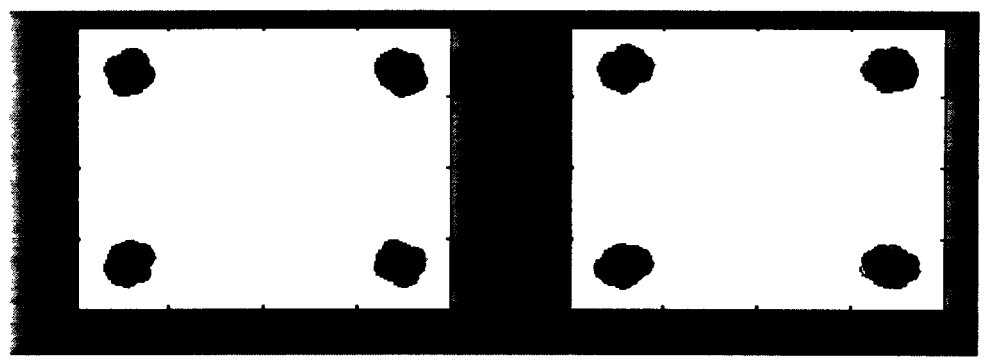
FIG. 11b shows a diagram illustrating a signal constellation with a skew of 8 ps.

In this regard, FIG. 10 shows a diagram illustrating deskewing simulation results. In this simulation, the XI sampling phase was the reference phase that did not change over time. Therefore, the VCO was locked on this XI sampling phase. It may be noted that the deference between relative equilibrium phases represents the skew. The simulated 112 G DP-QPSK signal with OSNR of 13 dB was efficiently deskewed using only 1000 symbols. The sampling phase changed in steps of UI/128. After 27 iterations, all three data paths were deskewed. Furthermore, FIG. 11a shows a diagram illustrating a signal constellation with compensated skew. For comparison issues, FIG. 11b shows a diagram illustrating a signal constellation with a skew of 8 ps.

Figure 12A:
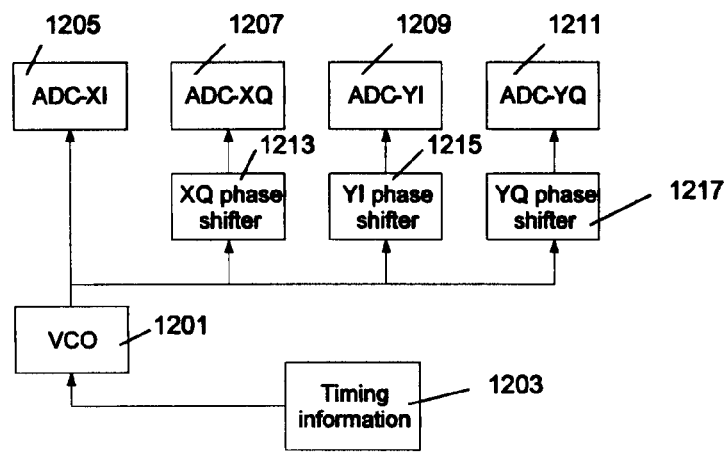
FIG. 12a shows a block diagram of a deskew arrangement for adjusting ADC sampling phases.

If the skew is estimated, the skew compensation may be done in several ways as indicated above. In this regard, FIG. 12a shows a deskew arrangement for adjusting the ADC sampling phases. Further, FIG. 12b shows a deskew arrangement for interpolation in time domain and FIG. 12c shows a deskew arrangement for interpolation in frequency domain.

The skew arrangement of FIG. 12a has a voltage controlled oscillator (VCO) 1201 receiving timing information 1203. Further, there are four analog digital converters (ADCs) 1205, 1207, 1209 and 1211 for XI data, XQ data, YI data and YQ data.

Because the VCO 1201 works on XI data, there are only three phase shifters 1213, 1215, 1217 coupled to the VCO 1201, namely an XQ phase shifter 1213 for XQ data, a YI phase shifter 1215 for YI data and an YQ phase shifter 1217 for YQ data.

Figure 12B:
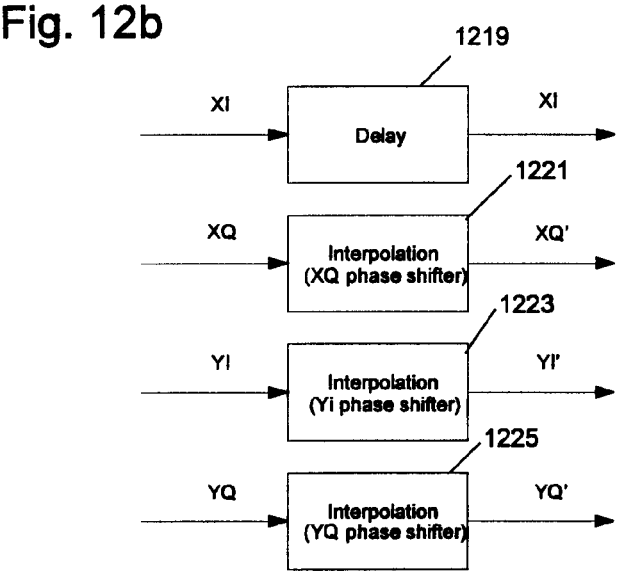
FIG. 12b shows a block diagram of a deskew arrangement for interpolation in time domain.
Figure 12C:
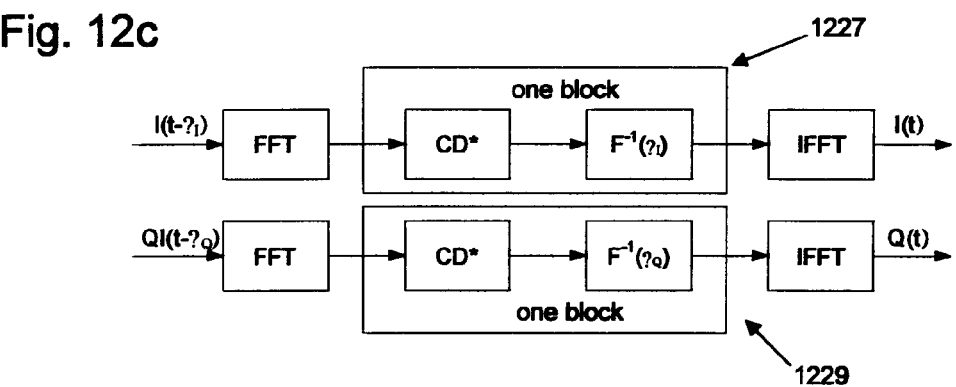
FIG. 12c shows a block diagram of a deskew arrangement for interpolation in frequency domain.

The skew arrangement for interpolation in time domain of FIG. 12b has a delay block 1219 for XI data and a respective interpolator 1221, 1223 and 1225 for XQ data, for YI data and for YQ data.

The skew arrangement for interpolation in frequency domain of FIG. 12c has two paths 1227 and 1229, wherein the path 1227 receives (t-τ) and outputs t and path 1229 receives Q (t-τQ) and outputs Q(t).

Figure 13:
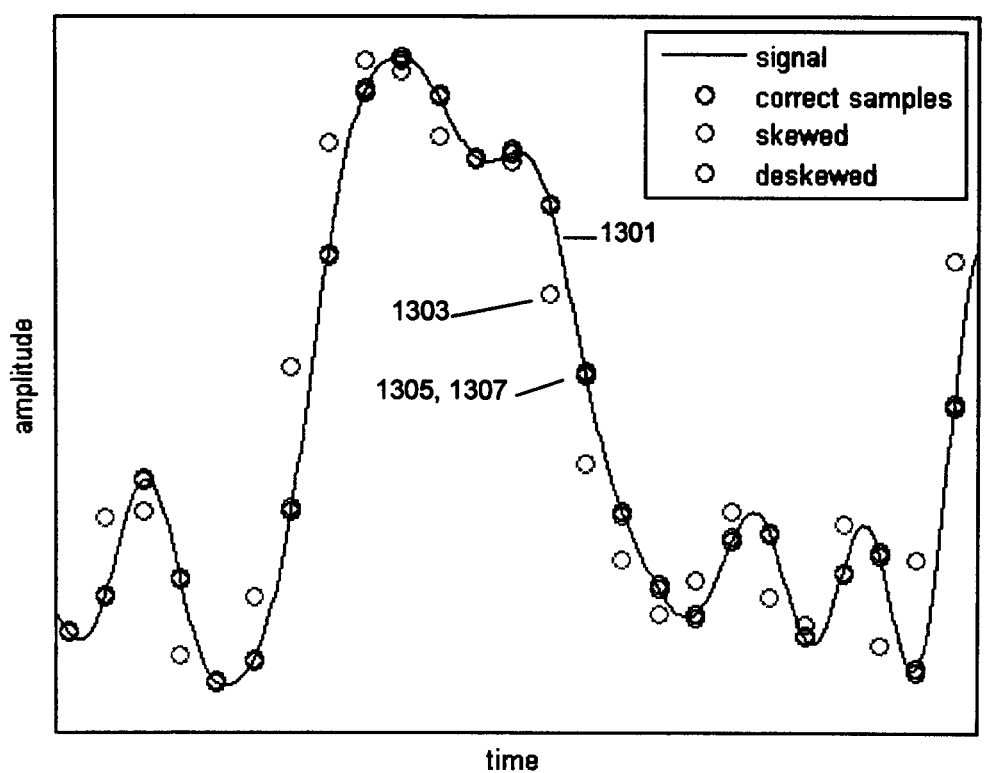
FIG. 13 shows a diagram illustrating results of deskewing in frequency domain.

To illustrate the deskewing results, FIG. 13 depicts a diagram illustrating deskewing in frequency domain. In detail, FIG. 13 shows the signal 1301, skewed samples 1303, deskewed samples 1305 and also corrected samples 1307.

Figure 14:
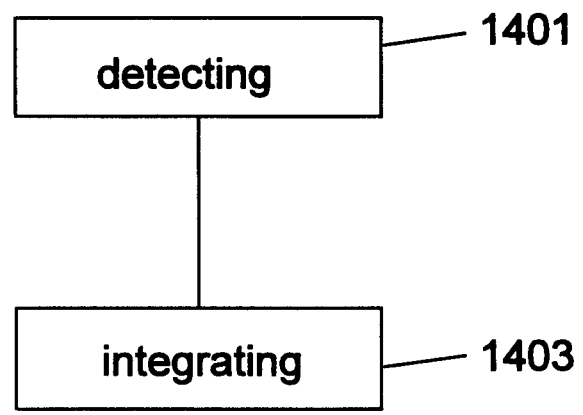
FIG. 14 shows a sequence of method steps for estimating skew.
Figure 15:
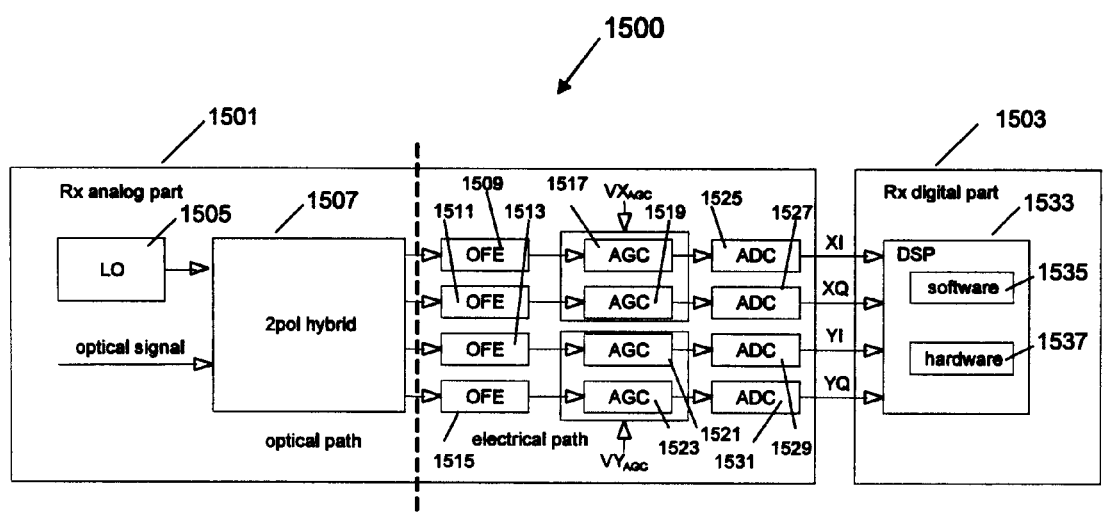
FIG. 15 shows a schematic block diagram of a coherent optical receiver.
Figure 16:
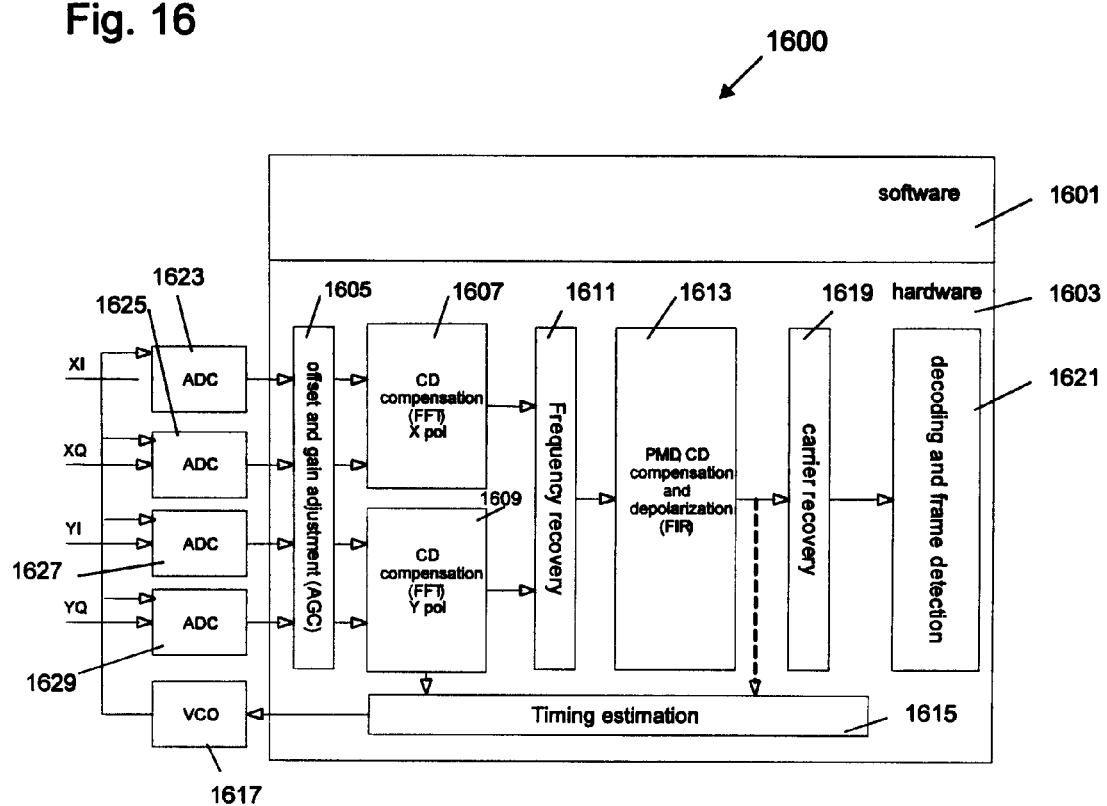
FIG. 16 shows a schematic block diagram of basic DSP blocks.
Figure 17:
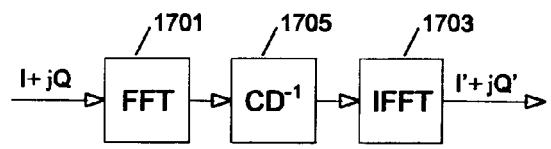
FIG. 17 shows a schematic block diagram of a CD compensation block.
Figure 18:
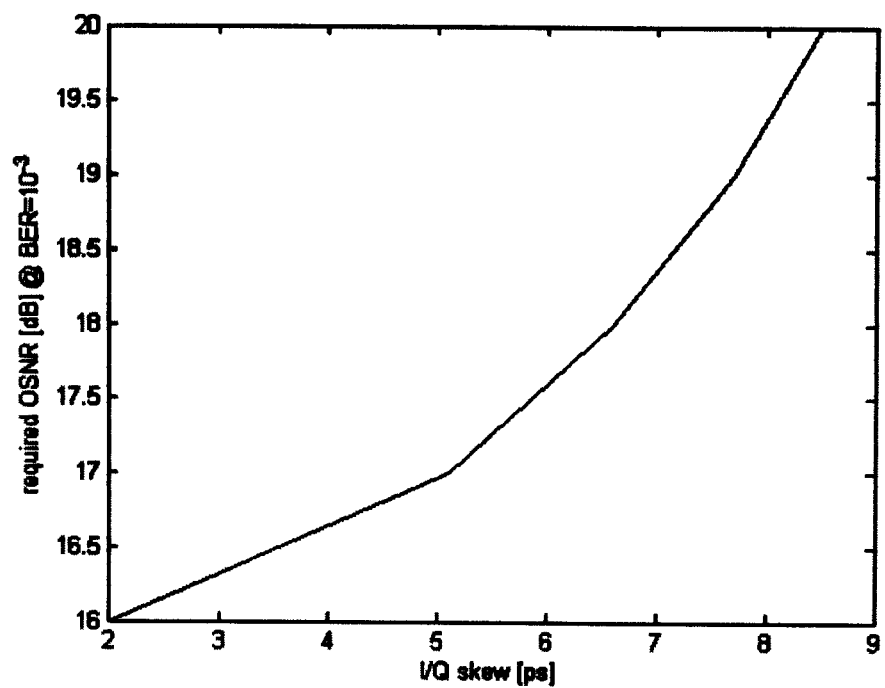
FIG. 18 shows OSNR penalties caused by skew.
Figure 19A:
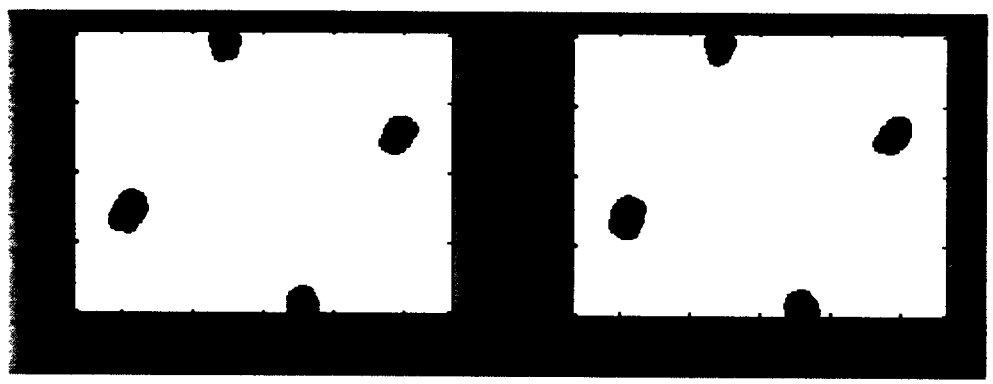
FIG. 19a shows a diagram illustrating a signal constellation with CD and without skew.
Figure 19B:
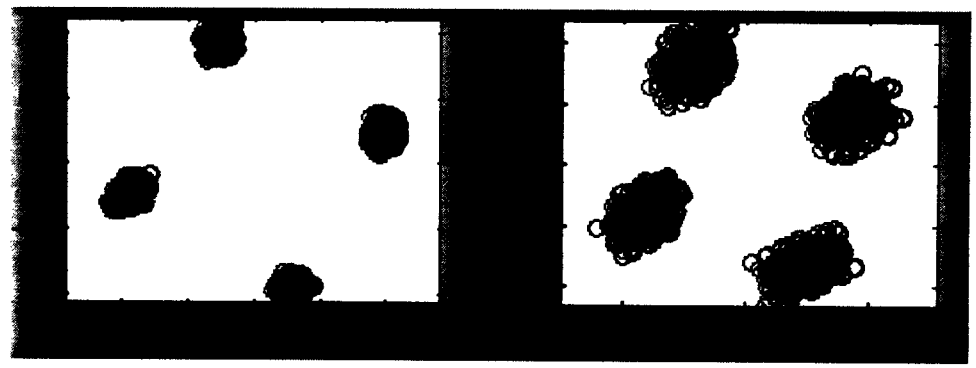
FIG. 19b shows a diagram illustrating a signal constellation with CD and with skew of 8 ps.

Further, FIG. 14 shows a sequence of method steps for estimating a skew between a first signal of a first signal data path and a second signal of a second data path in a coherent receiver.

In a step 1401, a phase of the first signal or of the second signal is detected to obtain a phase signal.

In step 1403, the obtained phase signal is integrated for providing an estimated skew between the first signal and the second signal.

REFERENCES

[1] C. E. Shannon, "A mathematical theory of communication," Bell. Syst. Tech. J. 27, 379-423 (1948).

[2] J. G. Proakis, Digital Communications, 4th ed. (McGraw-Hill, New York, 2001).

[3] R. D. Gitlin and S. B. Weinstein, "Fractionally spaced equalization: an improved digital transversal equalizer," Bell. Syst. Tech. J. 60, 275-296 (1981).

[4] N. Amitay and J. Salz, "Linear Equalization Theory in Digital Data Transmission over Dually Polarized Fading Radio Channels," Bell. Syst. Tech. J. 63, 2215-2259 (1984).

[5] T. Pfau, S. Hoffmann, R. Peveling, S. Bhandard, S. Ibrahim, O. Adamczyk, M. Porrmann, R. Noé and Y. Achiam, "First real-time data recovery for synchronous QPSK transmission with standard DFB lasers," IEEE Photon. Technol. Lett. 18, 1907-1909 (2006).

[6] E. Ip and J. M. Kahn, "Digital equalization of chromatic dispersion and polarization mode dispersion," J. Lightw. Technol. 25, 2033-2043 (2007).

[7] N. Stojanovic and T. Kupfer, "On the design of AGC circuits in IM-DD NRZ optical transmission systems", J. Lightw. Technol. 26, 3426-3433 (2008).

[8] K. H. Mueller and M. Muller, "Timing Recovery in Digital Synchronous Data Receivers", IEEE Transactions on Communications, 24, pp. 516-531 (1976)

[9] J. Alexander, "Clock recovery from random binary signals," Electron. Lett, vol. 11, pp. 541-542 (1975)

[10] F. Gardner, "A BPSK/QPSK Timing-Error Detector for Sampled Receivers", IEEE Transaction on Comm. 34, 423-429 (1986)

[11] H. Meyr et al., Digital Communication Receivers, John Wiley & Sons (1998).

The invention claimed is:

1. A skew estimator for estimating a skew in a coherent receiver, the skew estimator comprising:
    four phase detectors configured to detect a respective phase of an X-polarized in-phase signal (XI), an X-polarized quadrature-phase signal (XQ), a Y-polarized in-phase signal (YI) and a Y-polarized quadrature-phase signal (YQ) to obtain four phase signals;
    an adder configured to provide a sum signal by adding the obtained four phase signals;
    four blocks for the obtained four phase signals, wherein each block corresponds to one phase signal out of the obtained four phase signals, and each block comprises:
        a subtractor configured to provide a difference signal between the sum signal and a respective phase signal out of the obtained four phase signals,
        a low-pass filter configured to filter the output difference signal,
        a determiner configured to determine the sign of the filtered differential signal to obtain a sign signal, and
        an integrator configured to integrate the obtained sign signal to provide an estimated skew ($\phi_{XI}$) of the respective phase signal.

2. A skew compensator for compensating a skew in a coherent receiver, the skew compensator comprising:
    a skew estimator of claim 1 for providing an estimated skew; and
    a compensator configured to compensate the estimated skew.

3. The skew compensator of claim 2, further comprising at least one phase shifter configured to shift the phase of signals to control analog-digital-converter sampling phases.

4. The skew compensator of claim 2, further comprising an adaptor configured to adapt a Fast-Fourier-Transformator of the coherent receiver to deskew the estimated skew in a frequency domain.

5. The skew compensator of claim 2, further comprising an adjustor configured to adjust an interpolator of the coherent receiver to deskew the estimated skew in a time domain.

6. A method for estimating a skew, the method comprising:
- detecting a respective phase of an X-polarized signal (XI), an X-polarized quadrature-phase signal (XQ), a Y-polarized in-phase signal (YI) and a Y-polarized quadrature-phase signal (YQ) to obtain four phase signals;
- providing a sum signal by adding the obtained four phase signals;
- providing a difference signal between the sum signal and each respective phase signal out of the obtained four phase signals;
- filtering the output difference signal;
- determining the sign of the filtered output difference signal to obtain a sign signal;
- integrating the obtained sign an estimated skew ($\phi_{XI}$) of the respective phase signal.

* * * * *